United States Patent
Midgett et al.

(10) Patent No.: US 12,399,770 B2
(45) Date of Patent: Aug. 26, 2025

(54) ASSET INFORMATION CENTER FOR POWER GENERATING ASSETS OF A UTILITY PROVIDER

(71) Applicant: Florida Power & Light Company, Juno Beach, FL (US)

(72) Inventors: Earl S. Midgett, Stuart, FL (US); Namasivayam Piraviperumal Bala Selva, Westlake, FL (US); Ashwin Kunduru, Wellington, FL (US); Ralph W. Heistand, Jr., Jupiter, FL (US); Trestian V. Stewart, West Palm Beach, FL (US); Roossely Delica, Juno Beach, FL (US)

(73) Assignee: FLORIDA POWER & LIGHT COMPANY, Juno Beach, FL (US)

( * ) Notice: Subject to any disclaimer, the term of this patent is extended or adjusted under 35 U.S.C. 154(b) by 165 days.

(21) Appl. No.: 18/077,872

(22) Filed: Dec. 8, 2022

(65) Prior Publication Data
US 2024/0193034 A1   Jun. 13, 2024

(51) Int. Cl.
*G06Q 10/00*   (2023.01)
*G06F 11/07*   (2006.01)
(Continued)

(52) U.S. Cl.
CPC ...... *G06F 11/0793* (2013.01); *G06F 11/3452* (2013.01); *G06Q 10/06316* (2013.01);
(Continued)

(58) Field of Classification Search
None
See application file for complete search history.

(56) References Cited

U.S. PATENT DOCUMENTS

| | | | | |
|---|---|---|---|---|
| 7,937,164 B2 * | 5/2011 | Samardzija | ......... | G05B 23/021 700/109 |
| 8,886,574 B2 * | 11/2014 | Yuan | ................. | G05B 23/0229 706/904 |

(Continued)

FOREIGN PATENT DOCUMENTS

WO    2017022783 A1    2/2017

OTHER PUBLICATIONS

Hein, Phyo, Employing machine learning techniques to assess requirement change volatillity, Nov. 26, 2020, Research in Engineering Design, https://link.springer.com/article/10.1007/s00163-020-00353-6, p. 1-25 (Year: 2020).*

(Continued)

*Primary Examiner* — Joseph M Waesco
(74) *Attorney, Agent, or Firm* — Tarolli, Sundheim, Covell & Tummino LLP

(57) ABSTRACT

A system for generating a preventative maintenance change request (PMCR) that includes a remote utility controller that receives sensor data of a component of a utility asset generates an alert in response to a trend of the sensor data. The system further includes a data cluster analyzer that receives the alert and identifies a group of components similarly situated to the component by matching clustering data of the component with clustering data of the group of components. The data cluster analyzer generates a preventative maintenance opportunity that recommends changing preventative maintenance schedules for the group of components. The system also includes a data assimilator that assimilates the preventative maintenance schedule for the group of components based on assimilation data including failure history of each component of the group of components. Furthermore, the data assimilator generates the (Continued)

PMCR including the assimilated preventative maintenance schedule for the group of components.

20 Claims, 8 Drawing Sheets

(51) Int. Cl.
  *G06F 11/34* (2006.01)
  *G06Q 10/0631* (2023.01)
  *G06Q 10/20* (2023.01)
  *G06Q 50/04* (2012.01)
(52) U.S. Cl.
  CPC ....... *G06Q 10/06313* (2013.01); *G06Q 10/20* (2013.01); *G06Q 50/04* (2013.01)

(56) References Cited

U.S. PATENT DOCUMENTS

| | | | | |
|---|---|---|---|---|
| 10,317,864 | B2* | 6/2019 | Boettcher | G05B 19/042 |
| 10,338,565 | B1* | 7/2019 | Coffman | G05B 19/4097 |
| 10,867,455 | B2* | 12/2020 | Segal | G07C 5/008 |
| 2008/0082302 | A1* | 4/2008 | Samardzija | G05B 23/021 |
| | | | | 703/2 |
| 2010/0070237 | A1* | 3/2010 | Yitbarek | G06Q 10/20 |
| | | | | 702/179 |
| 2010/0211429 | A1* | 8/2010 | Benson | G06Q 10/20 |
| | | | | 700/111 |
| 2013/0084992 | A1* | 4/2013 | Frady | G07F 17/3241 |
| | | | | 463/42 |
| 2014/0244328 | A1* | 8/2014 | Zhou | G06Q 10/06311 |
| | | | | 705/7.13 |
| 2014/0288992 | A1* | 9/2014 | Wetzer | G06Q 10/08 |
| | | | | 705/7.23 |
| 2014/0350989 | A1* | 11/2014 | Telatar | G06Q 10/1097 |
| | | | | 705/7.21 |
| 2016/0016289 | A1* | 1/2016 | Benson | G05B 15/02 |
| | | | | 451/5 |
| 2016/0109495 | A1* | 4/2016 | Sterkel | H04L 67/303 |
| | | | | 702/62 |
| 2016/0300195 | A1* | 10/2016 | Harvey | G06Q 10/20 |
| 2018/0173214 | A1* | 6/2018 | Higgins | G06Q 10/20 |
| 2018/0349863 | A1* | 12/2018 | Restum | E02F 3/907 |
| 2019/0156443 | A1* | 5/2019 | Hall | G06Q 50/163 |
| 2019/0180527 | A1* | 6/2019 | Segal | G06N 20/00 |
| 2020/0074414 | A1* | 3/2020 | Restum | E02F 9/2808 |
| 2020/0285997 | A1* | 9/2020 | Bhattacharyya | G06N 7/01 |
| 2020/0324389 | A1* | 10/2020 | Benson | G07C 1/10 |
| 2021/0203157 | A1* | 7/2021 | Visweswariah | H02J 3/001 |
| 2021/0248693 | A1* | 8/2021 | Riland | G06Q 10/04 |
| 2021/0334675 | A1* | 10/2021 | Nakhjavani | G06Q 10/20 |
| 2022/0024607 | A1* | 1/2022 | Leitch | B64F 5/40 |

OTHER PUBLICATIONS

WOISR—International Search Report and Written Opinion for corresponding PCT/US23/37269, mailed Mar. 22, 2024.

Cinar, et al., "Machine Learning in Predictive Maintenance towards Sustainable Smart Manufacturing in Industry 4.0", Sustainability 2020, 12, 8211, pp. 1-42, doi:10.3390/su12198211.

* cited by examiner

600

612

| Component | Nuclear Reactor | Steam Turbine 1 | Valve 1 | Valve 2 |
|---|---|---|---|---|
| Tag | NR-1 | ST-1 | V-1 | V-1 |
| Manufacturer | M1 | M2 | M2 | M2 |
| Type | Nuclear Reactor | Steam Turbine | Throttle | Control |

610

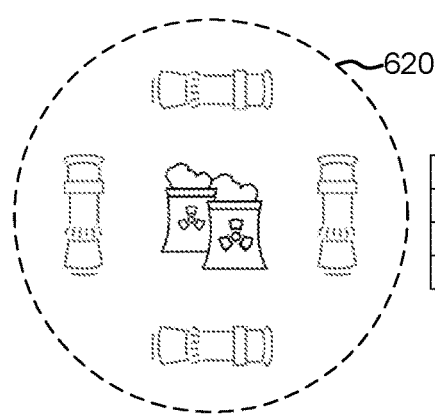

620

622

| Component | Nuclear Reactor | Steam Turbine 1 | Valve 1 | Valve 2 |
|---|---|---|---|---|
| Tag | NR | ST | V | V |
| Manufacturer | M1 | M2 | M2 | M2 |
| Type | Nuclear Reactor | Steam Turbine | Throttle | Control |

| Component | Nuclear Reactor | Steam Turbine 1 | Valve 1 | Valve 2 |
|---|---|---|---|---|
| Tag | NR-1 | ST-1 | V-1 | V-1 |
| Manufacturer | M1 | M2 | M2 | M2 |
| Type | N/A | N/A | N/A | N/A |

632

630

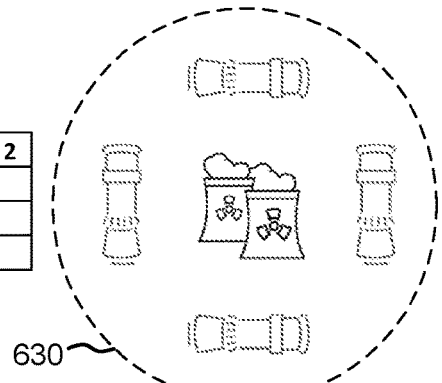

FIG. 6

ASSET INFORMATION CENTER FOR POWER GENERATING ASSETS OF A UTILITY PROVIDER

TECHNICAL FIELD

The present disclosure relates to classification and assimilation of maintenance opportunities among a group of power generating utility assets.

BACKGROUND

Electricity generation is the process of generating electric power from sources of primary energy. For utilities in the electric power industry, it is the stage prior to its delivery (transmission, distribution, etc.) to end users or its storage (using, for example, the pumped-storage method). Electricity is not freely available in nature, so it must be "produced" (that is, transforming other forms of energy to electricity). Production is carried out in power stations (also called "power plants"). Electricity is most often generated at a power plant by electromechanical generators, primarily driven by heat engines fueled by combustion or nuclear fission but also by other means such as the kinetic energy of flowing water and wind.

A nuclear reactor is a device used to initiate and control a fission nuclear chain reaction or nuclear fusion reactions. Nuclear reactors are used at nuclear power plants for electricity generation and in nuclear marine propulsion. Heat from nuclear fission is passed to a working fluid (water or gas), which in turn runs through steam turbines. These either drive a ship's propellers or turn electrical generators' shafts. Nuclear generated steam in principle can be used for industrial process heat or for district heating.

SUMMARY

One example relates to a non-transitory computer readable medium, the non-transitory computer readable medium having machine executable instructions. The machine executable instructions include a data cluster analyzer that receives an alert from a remote utility controller that identifies a component of a utility asset of a plurality of utility assets. The data cluster analyzer identifies a group of components similarly situated to the component by matching clustering data of the component with clustering data of the group of components. Further, the data cluster analyzer identifies asymmetry among preventative maintenance schedules for the group of components. The data cluster analyzer also generates a preventative maintenance opportunity that identifies the group of components. The machine executable instructions further include a data assimilator that assimilates the preventative maintenance schedule for the group of components based on assimilation data including failure history of each component of the group of components. The data assimilator further generates a preventative maintenance change request (PMCR) including the assimilated preventative maintenance schedule for the group of components. Additionally, the data assimilator provides the PMCR to a remote service device to output the PMCR for a service crew.

Another example relates to a method for generating a preventative maintenance change request (PMCR). The method includes receiving, by a data cluster analyzer operating on a computing platform, an alert from a remote utility controller that identifies a component of a utility asset of a plurality of utility assets. The method further includes identifying, by the data cluster analyzer, a group of components similarly situated to the component by matching clustering data of the component with clustering data of the group of components. The method also includes identifying, by the data cluster analyzer, asymmetry among preventative maintenance schedules for the group of components. Moreover, the method includes generating, by the data cluster analyzer, a preventative maintenance opportunity that identifies the group of components. Furthermore, the method includes assimilating, by a data assimilator, the preventative maintenance schedule for the group of components based on assimilation data including failure history of each component of the group of components. Also, the method includes generating, by the data assimilator, a preventative maintenance change request (PMCR) including the assimilated preventative maintenance schedule for the group of components. Additionally, the method includes providing, by the data assimilator, the PMCR to a remote service device to output the PMCR for a service crew.

Still another example relates to a system that includes a remote utility controller operating on a computing platform that receives sensor data and a trend of the sensor data for a plurality of components a utility asset of a plurality of utility assets. The remote utility controller generates an alert for the utility asset in response to the trend. The system further includes a data cluster analyzer, operating on the computing platform, that receives the alert from the remote utility controller and identifies a component of the plurality of components. The data cluster analyzer identifies a group of components similarly situated to the component by matching clustering data of the component with clustering data of the group of components. Further, the clustering data is received by the data cluster analyzer from a data repository operating on the computing platform. The data cluster analyzer also identifies asymmetry among preventative maintenance schedules for the group of components. Moreover, the data cluster analyzer generates a preventative maintenance opportunity that identifies the group of components and recommends changing preventative maintenance schedules for the group of components. The system can also include a data assimilator, operating on the computing platform, that assimilates the preventative maintenance schedule for the group of components based on assimilation data including failure history of each component of the group of components. The assimilation data is received by the data assimilator from the data repository. Furthermore, the data assimilator generates a preventative maintenance change request (PMCR) including the assimilated preventative maintenance schedule for the group of components. Additionally, the data assimilator provides the PMCR to a remote service device to output the PMCR for a service crew.

BRIEF DESCRIPTION OF THE DRAWINGS

FIG. 6 illustrates examples of clustering data for components of groups of utility assets.

DETAILED DESCRIPTION

Figure 1:
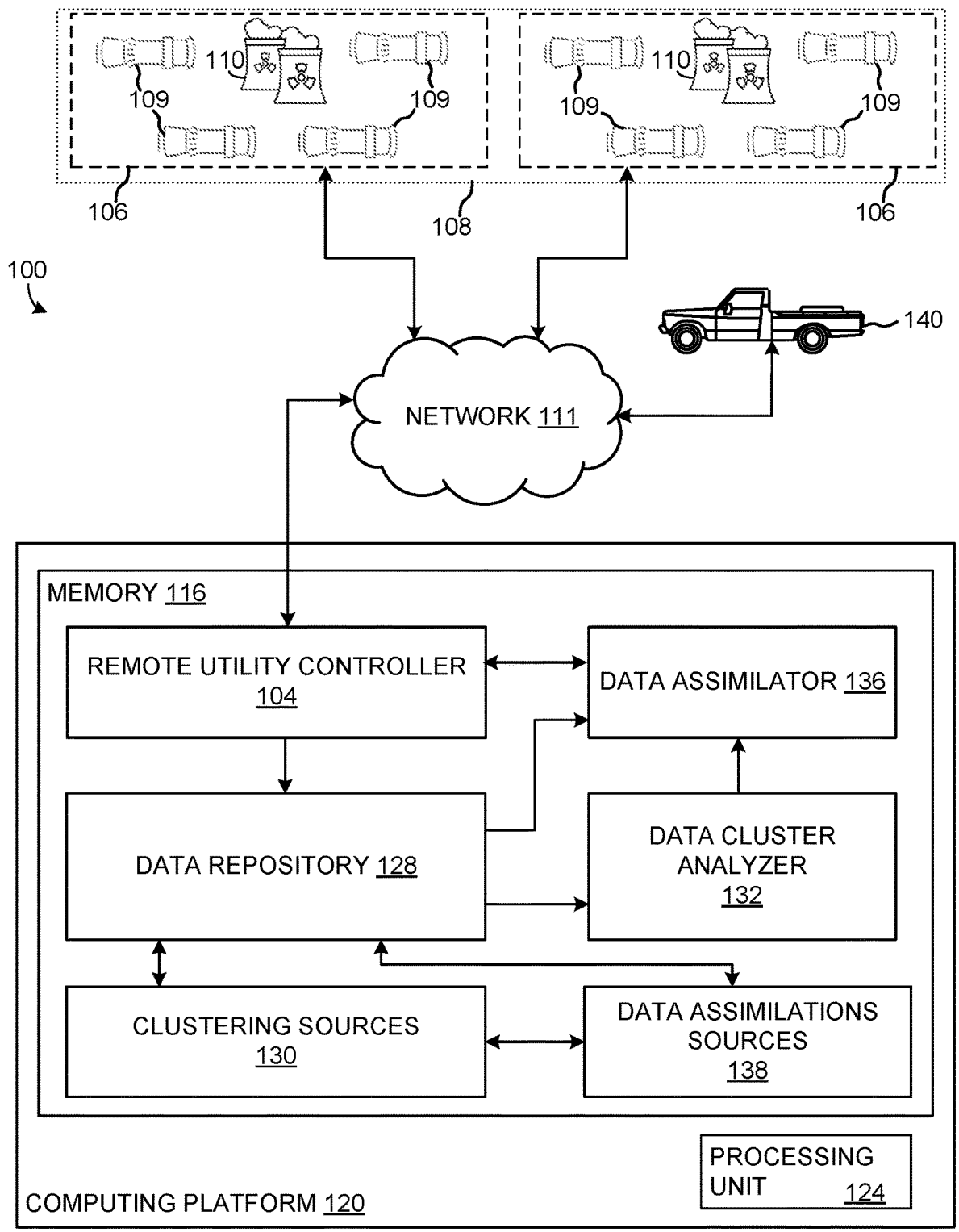
FIG. 1 illustrates an example of an asset information center.

The present disclosure relates to an asset information center that employs machine learning to automatically identify maintenance opportunities in a group of utility assets and automatically generate a preventative maintenance change request (PMCR). The group of utility assets can include a plurality of components that each have a corresponding preventative maintenance schedule. A preventative maintenance schedule can include appropriate calibration and preventative maintenance, and maintenance procedures over time at a given frequency. A fleet of utility assets can include a plurality of groups of utility assets, such that the fleet of utility assets can include, for example 450,000 components or more that each have a corresponding preventative maintenance schedule. Accordingly, the asset information center can be employed to identify preventative maintenance opportunities across the fleet of utility assets, such that the asset information center can be employed to improve efficiency of preventative maintenance operations for the example 450,000 components or more (or less than 450,000).

In an example, a group of utility assets can include equipment in a nuclear power generation facility, such that the group of utility assets can include a group of steam turbines corresponding to a nuclear reactor or a nuclear power generator, or a plurality of nuclear reactors of a nuclear power generator. In examples where the group of assets represent a group of steam turbines, each of the steam turbines of the nuclear power generator can be similarly situated, such that each steam turbine of the nuclear reactor includes similar components. Moreover, the group of utility assets can include a plurality of similarly situated nuclear power generators that each include a corresponding plurality of steam turbines.

The asset information center is configured to receive sensor data from the group of utility assets, such as the nuclear power generators. Accordingly, the asset information center can receive an indication that a component of the group of utility assets has failed or is operating below an operational efficiency. That is, the asset information center can receive a work order or an error notification for a given component. In response, the asset information center can provide the work order to a graphical user interface (GUI) for a user to analyze the work order. The GUI can enable the user to enter additional information about the given component and work order, such as identification of similarly situated components, as well as a recommendation and reason for change to a corresponding preventative maintenance schedule or work order. Therefore, the GUI of the asset information center can allow a user to generate a work order and/or preventative maintenance opportunity that includes information provided received by the asset information center.

Alternatively, the asset information center is employed to identify the preventative maintenance opportunity by applying a data clustering analysis on data from clustering sources stored in a data repository corresponding to a component identified by the received work order or indication. Stated differently, the asset information center can identify when similarly situated components are maintained differently, such that preventative maintenance schedules of a component in the group of utility assets can be changed to extend life of the components and increase maintenance efficiency. Moreover, clustering data from clustering sources can define information related to components of the group of utility assets, such as manufacture and part data, as well as component types and tags. Additionally, the asset information center can store preventative maintenance schedules for corresponding components of the group of utility assets. In an example, the asset information center can identify components similarly situated to a given component by matching tags provided by a first clustering source that are assigned to steam turbines of a group of utility assets. In some examples, the steams turbines do not have matching tags. Accordingly, the asset information center can employ clustering data from a second clustering source that defines the manufacturer to identify similarly situated components steam turbines of a group of utility assets. Therefore, the asset information center can identify similarly situated components of a group of utility assets based on clustering data that varies in format and/or clustering source. The similarly situated components can be a group of components (e.g., subset of the plurality of components) that includes the given component.

The asset information center can further detect misalignments of preventative maintenance schedules of similarly situated components of a group of utility assets. In an example, a given valve in a steam turbine of the group of utility assets can have a preventative maintenance schedule that has a higher frequency of calibration tasks compared to similarly situated valves identified by the asset information center. Therefore, the preventative maintenance schedule of the given valve is misaligned with the preventative maintenance schedules of the similarly situated valves. Accordingly, the asset information center can perform clustering analysis (e.g., machine learning) on the preventative maintenance schedules of the similarly situated valves to identify the misalignment. By employing the clustering analysis on preventative maintenance history of the valves, the asset information center further can generate a preventative maintenance opportunity that includes a recommendation for correcting the misalignment and reason for the recommendation.

In response to generation of a preventative maintenance opportunity, the asset information center can generate a PMCR based on the preventative maintenance opportunity and assimilation data from various data assimilations sources. Data assimilations (e.g., artificial intelligence) can be performed on assimilation data and the preventative maintenance opportunity to generate the PMCR. An example data assimilations source can be work order history, such that assimilation data derived from work orders can include failure history of similarly situated components. Accordingly, if a given valve has not previously failed and is calibrated less frequently than similarly situated valves and does not have any previous failures, the asset information center can generate a PMCR to align preventative maintenance schedules with the given valve. Additionally, data associated with a given component can be employed to identify potential one-off conditions, such that a degraded component or a component in a particular adverse environment does not imbalance assimilation data.

FIG. 1 illustrates an asset information center 100. The asset information center 100 can be a system that includes a remote utility controller 104 that is employed to control a nuclear power generator 106, or a plurality of nuclear power generators 106. The plurality of nuclear power generators 106 can be of a fleet of utility assets 108, which can include additional nuclear power generators 106 and other types of utility assets, such as wind, geothermal, solar, and solar power plants. The nuclear power generator 106 can include a plurality of steam turbines 109 employed to generate power from steam provided from a nuclear reactor 110 (e.g., an atomic pile). The nuclear power generators 106 can be similarly situated. Moreover, the plurality of steam turbines 109 can be similarly situated. That is, each of the steam turbines 109 includes a plurality of components, such as motors, pumps and/or valves, that can be of a same make and model. Further, the steam turbines 109 and nuclear reactor 110 of the nuclear power generator 106 can be equipped with a plurality of sensors to measure operational states, such as power generation and/or rotations per minute (rpm). Additionally or alternatively, the plurality of sensors can be positioned proximal to the plurality of steam turbines of the nuclear power generator 106 (e.g., upstream).

The remote utility controller 104 can receive data from the plurality of sensors of the plurality of steam turbines of the nuclear power generator 106 via a network 111. The network 111 can be a point-to-point network, such as a cellular network or a Wi-Fi network. In examples where the network 111 is a cellular network, the cellular network can be implemented with a 3G network, a 4G Long-Term Evolution (LTE) network, a 5G network, etc. The remote utility controller 104 can be stored in a memory 116 of a computing platform 120 that also includes a processing unit 124. The remote utility controller 104 can further store the data received from the nuclear power generator 106 in an historical record of a data repository 128 that is stored in the memory 116.

The memory 116 is implemented as non-transitory computer readable medium that stores machine executable instructions. In various examples, the memory 116 is volatile or non-volatile random access memory, such as a solid state drive, a hard disk drive, flash memory or a combination thereof. The processing unit 124 is implemented as one or more processor cores. The processing unit 124 accesses the memory 116 and executes the machine executable instructions. The network 111 could be implemented for example, as a public network (e.g., the Internet), a private network (e.g., a carrier network) or a combination thereof. The network 111 is accessed through a network interface, such as a network interface card of the computing platform 120. The computing platform 120 could be implemented in a computing cloud. In such a situation, features of the computing platform 120, such as the processing unit 124, the network interface, and the memory 116 could be representative of a single instance of hardware or multiple instances of hardware with applications executing across the multiple of instances (i.e., distributed) of hardware (e.g., computers, routers, memory, processors, or a combination thereof). Alternatively, the computing platform 120 could be implemented on a single dedicated server.

In an example, the remote utility controller 104 can provide a dashboard with a graphical user interface (GUI) that displays sensor data received from the fleet of utility assets 108. Additionally or alternatively, the GUI can display a work order received for a component of the fleet of utility assets 108, such as a motor or valve of a steam turbine 109. In response to receiving the work order or sensor data, a user can input data related to the component identified by the work order or indication. That is, the user can input similarly situated components, a preventative maintenance change type, and a work order request. Furthermore, the user can input a recommendation and reason for the change and/or recommendation. Accordingly, the user inputs to the GUI can generate a preventative maintenance opportunity. Because the user is provided sensor data from the GUI about a given component, the user can identify a trend associated with the sensor data.

For example, the given component can be a valve of a steam turbine 109. The remote utility controller 104 can receive an indication that the valve has failed, or determine that the valve has failed based on received sensor data. Accordingly, the user can identify another component that is negatively impacting performance of the valve, such as a pump. Therefore, the user can identify the pump and/or the valve in the preventative maintenance opportunity and recommend a work order for changing the pump and/or valve, as well as stating that the reason for the change is failure of the valve. Moreover, the remote utility controller 104 can provide the information input by the user to the data repository 128.

In another example, the given component can be a motor of a steam turbine 109, such as a motor driving a pump of the steam turbine 109. Sensor data from the motor can show that revolutions per minute (RPM) of the motor are trending down, whereas the motor rpm should be stable or trending up. Accordingly, the user can identify another component that is negatively impacting performance of the motor, such as the pump driven by the motor. Therefore, the user can identify the motor in the preventative maintenance opportunity and recommend a work order for changing the pump of the motor, as well as stating the reason for the change as the down trend in motor RPMs. Moreover, the remote utility controller 104 can provide the information input by the user to the data repository 128.

In another example, the data repository 128 stores clustering data from clustering sources 130. Clustering data can include component manufacturer and part data, component type, component preventative maintenance schedule (e.g., number and frequency of preventative maintenance tasks), component types, keywords (e.g., component name), component tags (e.g., identifiers), and locations of components. The clustering sources can be lookup tables, asset management suites, and data management suites that are integrated with the asset information center 100. Moreover, a first clustering source 130 may provide component tags, a second clustering source 130 may provide manufacturer and part data, and a third clustering source 130 may provide component preventative schedules. Alternatively, the remote utility controller 104 can receive data from the clustering sources 130 to store the data in the data repository 128.

The asset information center 100 can further include a data cluster analyzer 132. The data cluster analyzer 132 can receive the clustering data from the data repository 128 in response to a given component being flagged by the remote utility controller 104. That is, the data cluster analyzer 132 can identify a given component in response to receiving a warning or failure alert for the given component from the remote utility controller 104, execution of a maintenance work order indicated by the remote utility controller 104, or manual user instantiation. For example, sensor data received by the remote utility controller 104 can indicate that rotations per minute (RPM) of a motor are trending down, whereas the motor rpm should be stable. Accordingly, the data cluster analyzer 132 can receive the clustering data from the clustering sources corresponding to the motor that is identified in the received warning or failure alert for the given component from the remote utility controller 104.

In response to receiving clustering data, the data cluster analyzer 132 can identify preventive maintenance opportunities by applying machine learning to clustering data. In an example, the data cluster analyzer 132 can identify the given component and related clustering data from various clustering sources 130, such as a tag for the given component. Accordingly, the data cluster analyzer 132 can match the tag for the given component with a group of similarly situated components (e.g., subset of the plurality of components) based on a tags provided by a first clustering source 130.

In other examples, the given component has a unique tag, such that the given component cannot be matched with other similarly situated components based on tags provided by the first clustering source 130. Accordingly, the data cluster analyzer 132 can match the given component with similarly situated components based on clustering data provided by a second clustering source 130. That is, the data cluster analyzer 132 can match the given component with similarly situated components using manufacturer and part data provided by the second clustering source 130.

For example, if the given component identified by a warning alert from the remote utility controller 104 is a motor, the data cluster analyzer can employ clustering data to identify similarly situated motors. That is, the data cluster analyzer 132 can identify similarly situated components based on component tags, manufacturer and part data, and other clustering data received from clustering sources. Furthermore, the data cluster analyzer can be employed to match the trend of RPMs of the motor to other motors to identify similarly situated motors. However, if the trend of RPMs of the motor does not align with similarly situated motors, the data cluster analyzer 132 can determine that the motor is misaligned with similarly situated motors. Accordingly, the data analyzer 132 can generate a preventative maintenance opportunity that identifies the motor, as well as a recommendation based on the trend of the RPMs as a reason for change. That is, the data cluster analyzer 132 can recommend replacing the motor and/or a given pump based on the trend of RPMS of the motor over time.

The data cluster analyzer 132 can further generate a preventative maintenance opportunity by applying machine learning to similarly situated components (e.g., matched components). To generate a preventative maintenance opportunity, the data cluster analyzer 132 can receive preventative maintenance schedules of each of the similarly situated components from a third clustering source 130. The data cluster analyzer 132 applies machine learning to the preventative maintenance schedules of the similarly situated components to compare the preventative maintenance schedules and identify misalignments among the preventative maintenance schedules of the similarly situated components. Stated differently, the data cluster analyzer 132 identifies asymmetries among the preventative maintenance schedules of the similarly situated components. For example, a given valve of a steam turbine 109 can have a preventative maintenance schedule that has a higher frequency than similarly situated valves. Accordingly, the preventative maintenance schedules of the similarly situated valves is misaligned. In other words, the preventative maintenance schedules of the similarly situated valves have different trends.

The data cluster analyzer 132 can classify a misalignment among similarly situated components as a preventative maintenance opportunity. Additionally, the data cluster analyzer 132 can receive data from a fourth clustering source 130 to generate a recommendation and provide a reason for change. For example, the fourth clustering source 130 can provide Functional Importance Determination (FID) that establishes boundaries for the frequency of preventative maintenance schedules of the similarly situated components. Moreover, the FID for each component of the similarly situated components characterizes boundaries for the preventative maintenance schedule of the corresponding component. Thus, the data cluster analyzer 132 can recommend that the given valve has a calibration frequency that falls below an FID requirement, such that the data cluster analyzer recommends increasing the frequency for the given valve and provides the FID as a reason for change. Stated differently, the FID for a given component represents boundaries for frequency of preventative maintenance procedures, such that the data cluster analyzer 132 can flag a component for preventative maintenance procedure frequency that exceeds the boundaries. Accordingly, the data cluster analyzer 132 generates a preventative maintenance opportunity that identifies the similarly situated components, recommendation, and reason for change.

The asset information center 100 can further include a data assimilator 136 that can receive the preventative maintenance opportunity from the remote utility controller 104 that was generated by user input at the GUI, which defines at least a component, recommendation, and reason for change. Alternatively, the data cluster analyzer 132 can provide the data assimilator 136 with an automatically generated preventative maintenance opportunity. The data assimilator 136 can also receive assimilator data from data assimilations sources 138. Data assimilations sources 138 include cost tools, data deviation analysis tools, component databases, technical specifications of components (e.g., an Updated Final Safety Analysis Report), work order history, FID, and an audit database. Technical specifications of components can define dimensions and safety classifications of components, as well as stress and design criteria for components that is derived from standards organizations (e.g., American Society of Mechanical Engineers (ASME) codes). Assimilator data can be employed by the data assimilator 136 to derive component reliability and trend data, failure history, preventative maintenance history, and data deviations from the data assimilations sources 138 for components identified by the preventative maintenance opportunity. Accordingly, the data assimilator 136 can generate a preventative maintenance change request (PMCR) based on the preventative maintenance opportunity.

For example, the data assimilator 136 can provide a different recommendation and reason for change than what was provided by the preventative maintenance opportunity generated by a user. That is, the preventative maintenance opportunity can identify a given valve and recommend replacement of an associated pump based on similarly situated valve failures that exhibited similar trends of sensor data (e.g., pressure). By comparing the work order history of the given sensor with the work order history of similarly situated sensors, the data assimilator 136 can generate an updated preventative maintenance procedure and reason for change. That is, the work order history of similarly situated valves with similar pressure trend data to the given valve can indicate replacement of a faulty pump corresponding to the given valve. Therefore, it is likely that a similar sensor of the given motor needs to be replaced. Thus, the data assimilator 136 can generate a PMCR with an updated recommendation to replace the faulty sensor and providing the work order history of similarly situated motors as a reason for the update (e.g., change).

In another example, the data assimilator 136 can analyze trend data of similarly situated components to determine a preventative maintenance procedure for the similarly situated components. For example, a given valve of a plurality of similarly situated valves may be calibrated at a higher frequency than the similarly situated valves, which is ascertained from preventative maintenance schedules. However, the data assimilator 136 can determine that the given valve can have zero or less failures than the similarly situated valves based on work order histories. Accordingly, the data assimilator 136 can generate a PMCR that increases the frequency that the similarly situated valves are calibrated to assimilate the preventative maintenance among the similarly situated valves in a manner that is predicted to reduce failures. In another example, the given valve can be calibrated at a lower frequency than the similarly situated valves and experience more failures than the similarly situated valves. Accordingly, the PMCR can increase the frequency that the given valve is calibrated to assimilate calibration frequency of the given valve with the similarly situated valves in a manner that is predicted to reduce failures.

Moreover, the data assimilator 136 can identify boundaries associated with the recommended preventative maintenance procedures. For example, the data cluster analyzer 132 may provide a recommendation to increase a given valves calibration frequency to assimilate with similarly situated valves and provide and FID requirement as a reason. That is, the given valve may be calibrated at a frequency that is lower than an FID requirement. However, the data assimilator 136 can determine that the given valve has experienced failure no more than similarly situated valves, which are calibrated at a frequency higher than the FID requirement. Accordingly, the data assimilator 136 can generate a PMCR that assimilates the preventative maintenance schedules of the similarly situated valves at a frequency at or slightly above the FID requirement.

In another example, the data assimilator can compare the trend of a given motor's rpms over time, the motor being identified by the preventative maintenance opportunity. Accordingly, the data assimilator 136 can compare the trend of the given motor's rpms to trends of rpms of other similarly situated motors. Therefore, the given motor can be matched to other similarly situated motors that have similar trends in rpms. Furthermore, the data assimilator 136 can receive work order history associated with the similarly situated motors that have similar trends. That is, the data assimilator 136 can identify when the similarly situated motors failed in addition to trends of rpm. Therefore, the data assimilator 136 can identify trends of failure in motors associated with trends of motor rpm. Accordingly, the data assimilator 136 can predict when a given motor will fail, as well as what work order will prevent failure of the given motor based on the work order history of the similarly situated motors with similar trends of rpm. In this example, if the work order history of the similarly situated motors with similar trends of rpm includes replacement of insulators in response to failure, the data assimilator 136 can predict that an insulator associated with the given motor will need to be replaced. Thus, the data assimilator 136 can generate a PMCR for replacing the insulator of the given motor prior to predicted failure. Moreover, the data assimilator 136 can verify that the preventative maintenance opportunity indicating that an insulator of the motor needs to be replaced, as recommended by a user for similar reasons.

In another example, the data assimilator 136 can provide a different recommendation and reason for change than what was provided by the preventative maintenance opportunity generated by a user. That is, the preventative maintenance opportunity can identify a given motor and recommend replacement of an associated insulator based on a recent trend of rpms of the given motor. By comparing the work order history of the given motor with the work order history of similarly situated motors, the data assimilator 136 can generate an updated preventative maintenance procedure and reason for change. That is, the work order history of similarly situated motors with similar rpm trend data to the given motor can indicate replacement of a faulty sensor of the motor. Therefore, it is likely that a similar sensor of the given motor needs to be replaced. Thus, the data assimilator 136 can generate a PMCR with an updated recommendation to replace the faulty sensor and providing the work order history of similarly situated motors as a reason for the update (e.g., change).

Moreover, the data assimilator 136 can identify boundaries associated with the trends of motor RPMs. For example, the data assimilator 136 can determine that RPMs of a given motor should not exceed or fall below certain boundaries based on a data assimilations source such as the FID requirements. Accordingly, the data assimilator 136 can generate a PMCR that assimilates the preventative maintenance schedules of the similarly situated motors to replace valves or motors that are operating at RPMs that are outside of the boundaries.

In response to generating the PMCR, the PMCR can be can provided to a service crew to execute the PMCR by the remote utility controller 104 via the network 111. Particularly, the PMCR can be provided to a remote service device 140 positioned with a service crew, the remote service device 140 being a tablet, mobile phone, and/or computer, represented as a bucket truck for the service crew in FIG. 1. The remote service device is employable to output the PMCR to the service crew. Alternatively, the data assimilator 136 can provide the PMCR to the remote service device 140. In an example, the service crew employing the remote service device 140 can maintain a component(s) identified by the PMCR and perform an action that is recommended in the PMCR. Alternatively, the PMCR can be flagged for review by the remote utility controller 104.

The asset information center 100 can be employed to generate a PMCR to assimilate preventative maintenance procedures of a component with similarly situated components. Because the asset information center 100 can receive data from a plurality of data assimilations sources 138, the asset information center 100 can improve efficiency of preventative maintenance and curtail downtime of utility assets. Furthermore, the asset information center 100 can accurately identify similarly situated components by receiving data from a plurality of clustering sources 130. Additionally, the asset information center 100 can employ machine learning in a data cluster analyzer 132 and data assimilator 136 to make determinations over large amounts of data (e.g., corresponding to over 450,000 components).

Figure 2:
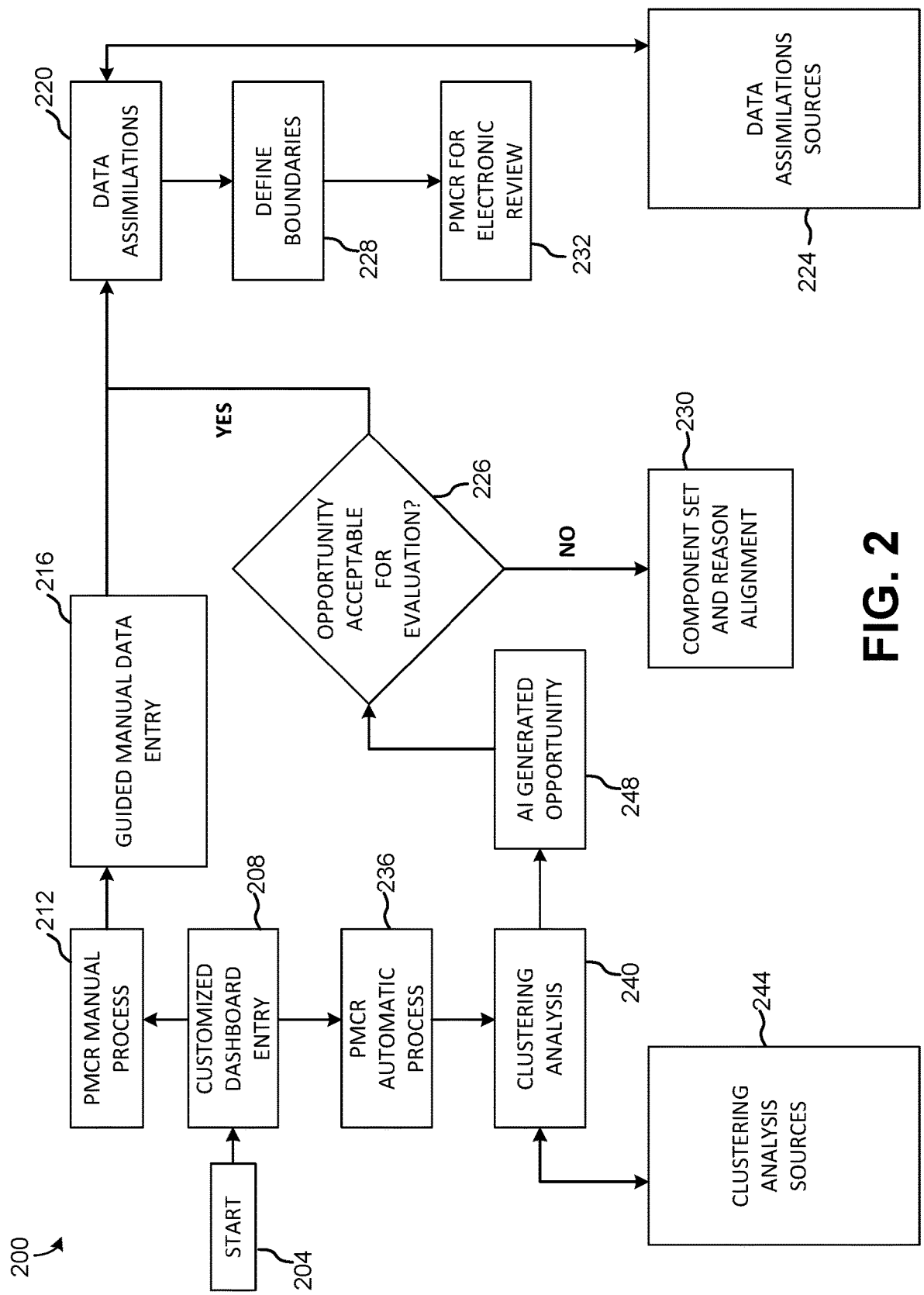
FIG. 2 illustrates a flowchart example for generating a preventative maintenance change request.

In view of the foregoing structural and functional features described above, an example method will be better appreciated with reference to FIG. 2. While, for purposes of simplicity of explanation, the example method of FIG. 2 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 2 illustrates a flowchart of an example method 200 for generating a PMCR by an asset information center, such as the asset information center 100 of FIG. 1. At 204, the method can begin in response to a work order being received by a remote utility controller, such as the remote utility controller 104 of FIG. 1. That is, the remote utility controller can receive sensor data for a plurality of components from a group of utility assets, such as the group of utility assets 108 of FIG. 1. The sensor data can indicate rpms of motor over time. Stated differently, the remote utility controller can receive sensor data that identifies a trend for operations of a component of the group of utility assets.

At 208, the remote utility controller can provide the sensor data for the component to a GUI. Alternatively, the remote utility controller can generate and/or instantiate a GUI to display the sensor data. Accordingly, the sensor data can be displayed by the GUI over time to display a trend. Moreover, the remote utility controller can be configured to provide a warning alert or a failure alert based on the trend. Additionally, the GUI can include a dashboard for a user to interact with and input data. At 212, the remote utility controller can require a user to review the warning or failure alert. Alternatively, the user can interact with the GUI to start a manual process.

At 216, the user can input data into the GUI to generate a preventative maintenance opportunity associated with a component identified by the warning or failure alert. Particularly, the user can recommend a preventative maintenance procedure for a component based on corresponding sensor data and trend displayed by the GUI. Additionally, the user can input a reason for change based on the sensor data and trend displayed by the GUI. For example, the user can recommend replacing a given component identified by the GUI based on sensor data and a trend corresponding to the given component. For example, the GUI can display a failure alert for the given component, as well as sensor data and a trend indicative of failure of the given component. Therefore, the user can recommend replacement of the given component and provide a reason for replacement to the GUI, such that the reason for replacement can cite the sensor data and trend. In another example, the user can recommend replacement of another component associated with the given component and provide the GUI with the sensor data and trend associated with the given component as a reason for replacement of the other component. In some examples, the user can also identify a group of components similarly situated with the given component (e.g., a subset of the plurality of components). In other examples, the user can recommend changing the preventative maintenance schedules of the given component and/or the other component. Moreover, the recommendation and reason for change can be provided by the user in a uniform format, such as a code. Alternatively, machine learning can be performed to convert the recommendation and reason for change to the uniform format.

At 220, the remote utility controller can provide the preventative maintenance opportunity, including the trend, recommendation, and reason, to a data assimilator (e.g., data assimilator 136 of FIG. 1). In response to receiving the preventative maintenance opportunity, the data assimilator can receive assimilator data from a data assimilations sources at 224, such as the data assimilations sources 138 of FIG. 1. The data assimilations sources can include work order history of components, component types, as well as trends of components. Accordingly, the data assimilator can identify a group of components similarly situated to the given component (e.g., a subset of the plurality of components) identified by the preventative maintenance opportunity. Moreover, the data assimilator can compare the assimilator data of the given component to the assimilator data corresponding to the similarly situated components. In response to comparing assimilator data of the given component and similarly situated components, the data assimilator can recommend a preventative maintenance procedure based on the comparison. Accordingly, the data assimilator can generate a PMCR to replace or repair components based on the recommended preventative maintenance procedures.

Figure 3:
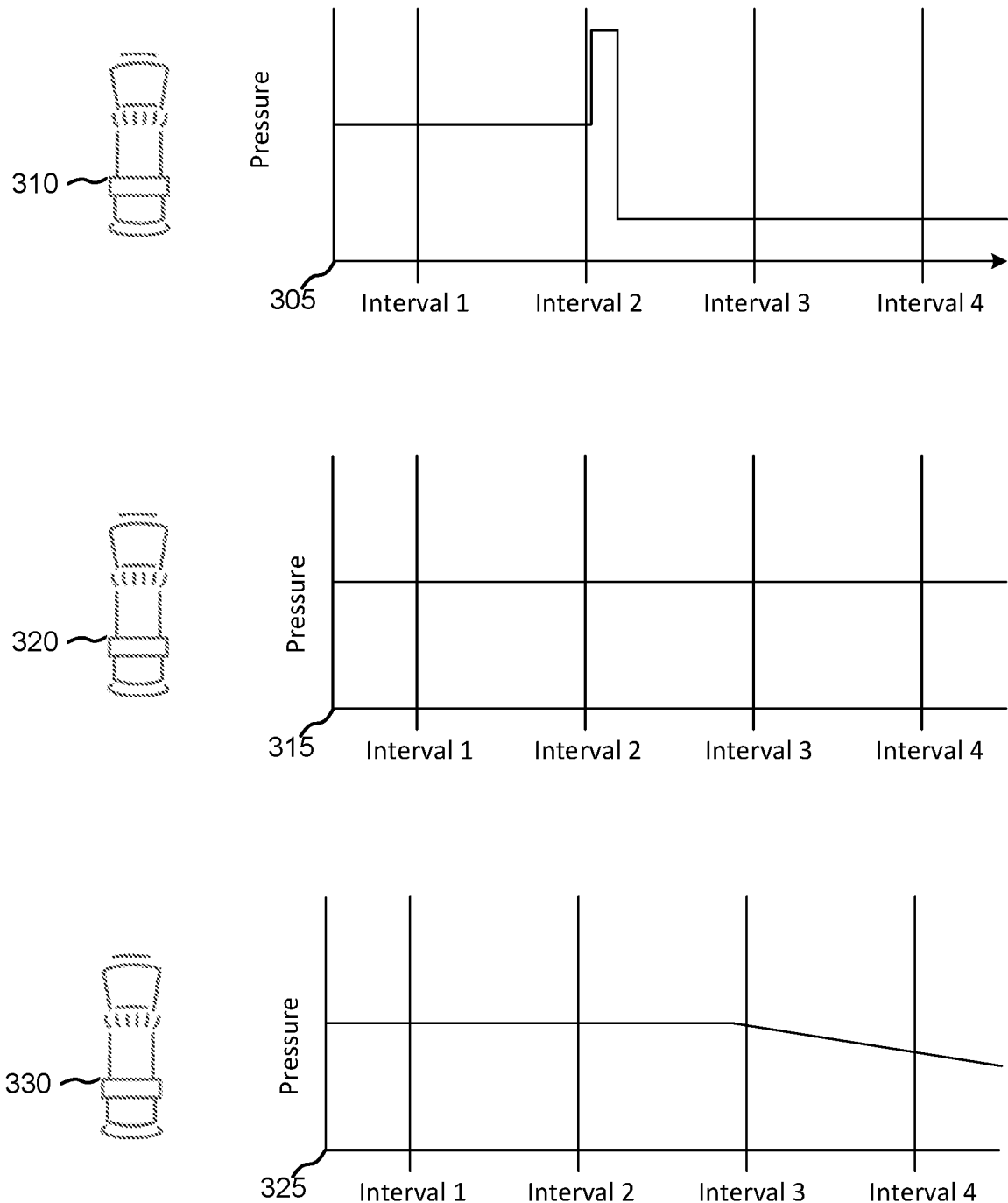
FIG. 3 illustrates examples of trends of a pressure from a valve of a steam turbine.

FIG. 3 illustrates example trends of pressure measured by a valve over time. Particularly, FIG. 3 illustrates an example first graph 305 that illustrates trend of pressure over time for a valve in a first steam turbine 310, which can be a steam turbine 109 of FIG. 1. The pressure can be measured by a sensor located at or proximal to the valve, and provided to a remote utility controller, such as the remote utility controller 104 of FIG. 1. The pressure can be sensor data provided to a GUI, such as in 208 of FIG. 2. As illustrated by the first graph 305, the pressure of the valve for the first steam turbine 310 increases rapidly near interval 2 and drops substantially. Because the pressure is intended to stay constant, such that control parameters of the motor are constant, the increase and drop in pressure indicate can indicate failure of the valve of the first steam turbine 310. Accordingly, the remote utility controller can provide a failure alert to the GUI for a user to view. Moreover, sensor data characterizing the pressure of the valve of the first steam turbine can be provided to a data assimilator, such as the data assimilator 136 of FIG. 1.

The data assimilator can compare the first graph 305 illustrating the trend in sensor data characterizing pressure of the valve of the first steam turbine 310 to other valves, such as the second graph 315 for a valve in a second steam turbine 320. Accordingly, the data assimilator can match the valve of the first steam turbine 310 to other similarly situated valves that have experienced similar trends of pressure. Therefore, the data assimilator can identify work orders that were performed for the other similarly situated valves in response to the similar trend of the valve. For example, the data assimilator can determine that the pressure trend of the valve of the first steam turbine 310 is indicative of a valve coupled to a faulty pump based on work order history of other similarly situated valves with similar pressure trends. Accordingly, the data assimilator can generate a PMCR with similar work orders to replace or repair the valve and corresponding pump of the first steam turbine 310.

Moreover, the valve of the second steam turbine 320 can provide the remote utility controller with sensor data characterizing constant pressure as illustrated in the second graph 315. Accordingly, the remote utility controller can provide the GUI with an indication that the valve of the second steam turbine 320 is operating efficiently. Moreover, a third graph 325 corresponding to a trend in pressure of a valve of a third steam turbine 330 can experience pressure that slowly declines near a third interval of time. Accordingly, the remote utility controller can provide a warning alert the GUI. In response, the user can generate a preventative maintenance opportunity that recommends replacing the valve and the pump for a reason related to lower pressure from the pump. That is, the user can provide a reason and recommendation for the preventative maintenance opportunity of the third steam turbine 330 that is similar to the valve of the first steam turbine 310. However, the data assimilator can compare the valve of the third steam turbine 330 to similarly situated valves that experienced similar pressure trends to the valve of the third steam turbine 330, which is different than the pressure trend experience by the valve of the first steam turbine 310. Accordingly, the data assimilator can determine that the valve of the third steam turbine 330 requires a different preventative maintenance procedure than what was recommended by the user and provided to the first steam turbine 310. Rather, the valve of the third steam turbine 330 can be experiencing a leak due to corrosion.

Therefore, the data assimilator can generate a PMCR for replacing the valve of the third steam turbine 330, rather than the valve and motor, similar to similarly situated valves with similar trends in pressure and work order history.

Referring back to FIG. 2, the data assimilator can further update preventative maintenance for a component identified in the PMCR. The data assimilator can receive preventative maintenance histories for each component and assimilate the preventative maintenance schedules corresponding to components to improve efficiency. Moreover, the data assimilator can assimilate the preventative maintenance schedules of components based on received preventative maintenance opportunity and work order history for similarly situated components.

Figure 4A:
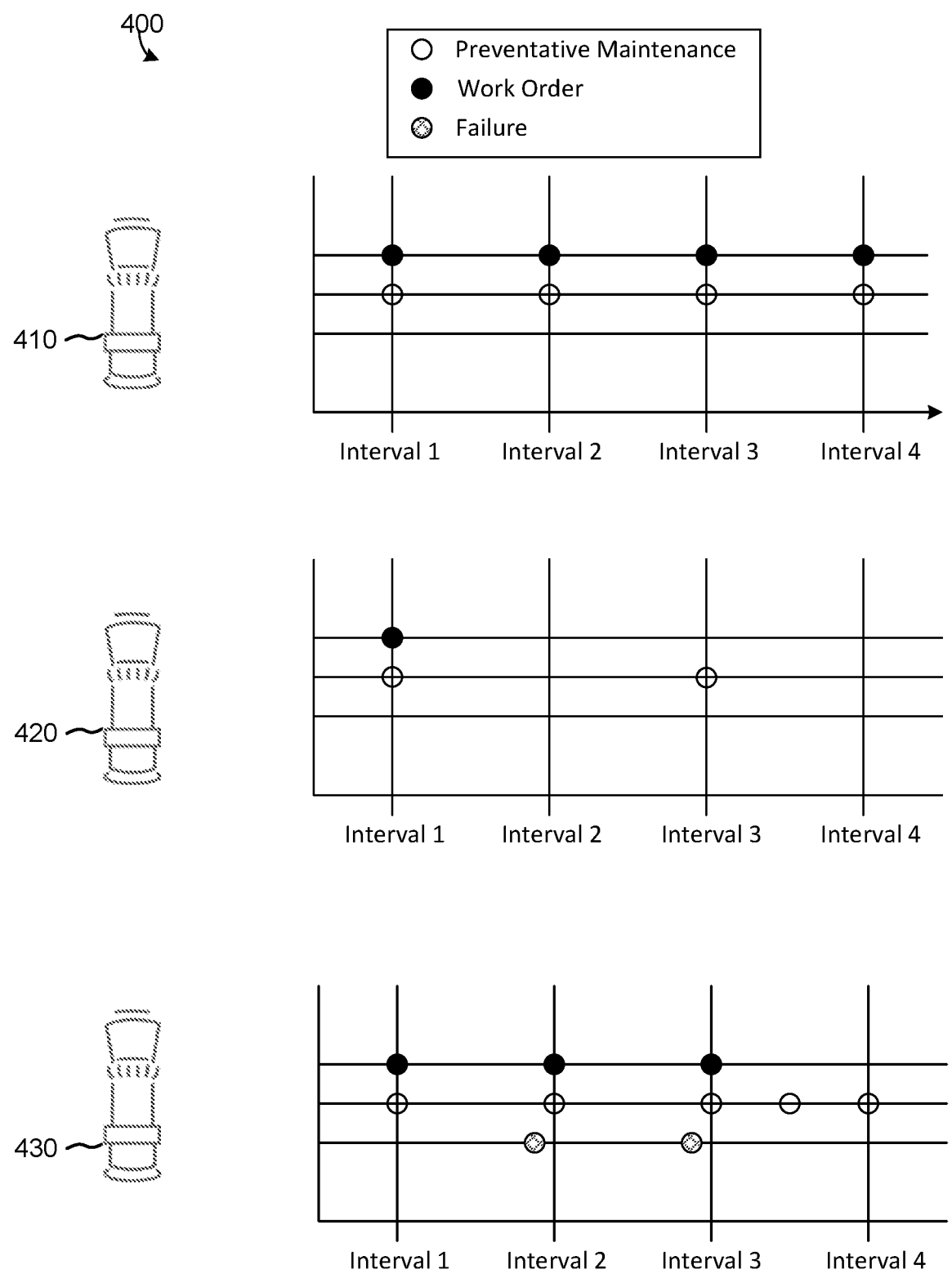
FIGS. 4A-4B illustrate example preventative maintenance schedules for a component of a steam turbine.
Figure 4B:
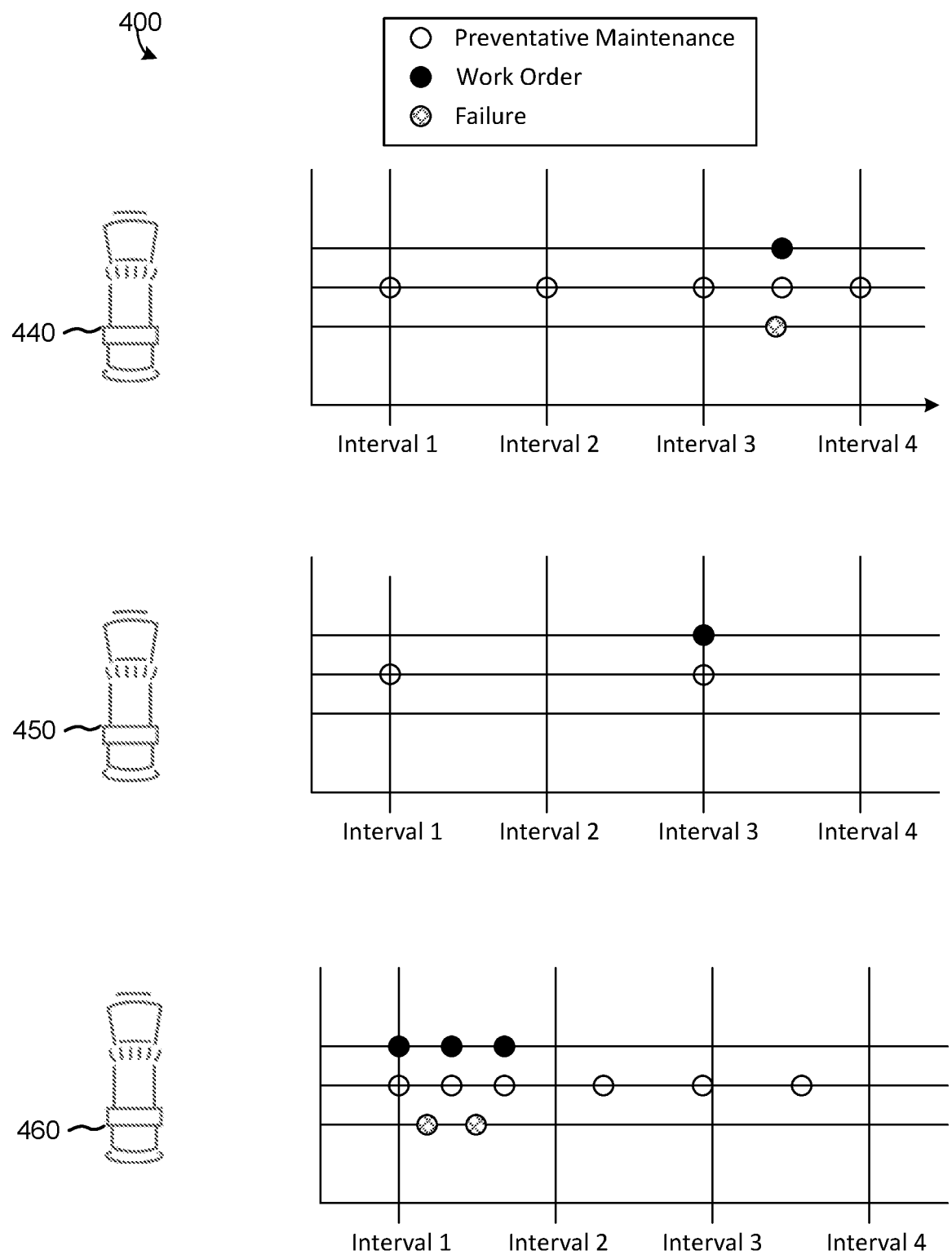

FIGS. 4A-4B illustrate example preventative maintenance and work order histories 400 of a component of a given steam turbine. The steam turbines can be the steam turbines of FIG. 3, such that the component is a valve. Alternatively, the component of the steam turbine can be a motor pump or valve. The preventative maintenance and work order histories 400 can be demonstrative of any of the components in a fleet of utility assets, such as the fleet of utility assets 108 in FIG. 1.

The hollow circles of FIGS. 4A-4B indicate executed preventative maintenance tasks of the given component across intervals of time, such as calibration. The black dots across the intervals of time indicate performance of work orders, such as repair or replacement of components. The circles with a cross-hatching across the intervals of time indicate failures of the given component.

The preventative maintenance and work order history of a first component 410 illustrates a work order being performed at each of four intervals of time. That is, at each interval of time, the first component is either replaced or repaired. Additionally, each replacement of the first component is accompanied by a preventative maintenance procedure such as calibration.

The preventative maintenance and work order history of the second component 420 has a work order performed at the first interval, as well as a preventative maintenance (e.g., calibration) procedure. Accordingly, if the first component 410 and second component 420 are similarly situated, a data assimilator can adjust the preventative maintenance schedule of the similarly situated components. That is, the second component has received preventative maintenance at two of the intervals, but has only needed to be replaced or repaired at the first interval. Instead, the first component 410 has been replaced/repaired at each interval of time. Accordingly, the data assimilator can assimilate the preventative maintenance schedule of the first component 410 to align with the preventative maintenance schedule of the second component 420.

The work order history of a third component 430 illustrates failure nearly before a second and third interval. Although the third component 430 was replaced and calibrated at the first and second intervals, the third component still failed prior to preventative maintenance at the second interval. Accordingly, the data assimilator can determine that the third component needs to be calibrated or provided preventative maintenance more frequently to prevent failure of the third component 430. Particularly, the data assimilator can predict when the third component will fail based on the work order history including failures. Therefore, the it can be determined that preventative maintenance can be provided earlier than when failure of the third component 430 historically fails at before the second and third intervals. Thus, preventive maintenance is provided to the third component 430 prior to where a failure would occur slightly before the fourth interval. That is, preventative maintenance is provided halfway between the third and fourth interval. Because of the increase in frequency of preventative maintenance, the third component 430 does not fail before the fourth interval. Moreover, the data assimilator can identify similarly situated components to the third component 430 to update the frequency of preventative maintenance for similarly situated components.

FIG. 4B illustrates a fourth component 440. The fourth component can have a preventative maintenance schedule at each of the four intervals. Although the fourth component 440 does not fail before the third interval, the fourth component fails between the third and fourth interval requiring a work order and accompanying preventative maintenance. Accordingly, the data assimilator can determine that the fourth component 440 should be calibrated or receive preventative maintenance more frequently, such as every half interval.

A fifth component 450 can be similarly situated to the fourth component 440. In contrast, the fifth component 450 receives preventative maintenance every other interval, such as at the first and second interval. However, the fifth component 450 is replaced/repaired at the third interval. Accordingly, the data assimilator can compare the preventative maintenance schedules to determine a preventative maintenance schedule that will result in less failures. That is, preventative maintenance procedures of the fourth component 440 and fifth component 450 can be assimilated to receive preventative maintenance more frequently (e.g., calibration) similar to the fourth component 440 or receive preventative maintenance less frequently similar to the fifth component 450. However, the fifth component 450 is also repaired or replaced more frequently while being calibrated or receiving preventative maintenance less frequently. Accordingly, the data assimilator can decide which preventative maintenance to use for assimilation based on another data assimilations source.

For example, the data assimilations sources can include a cost tool, such that the data assimilator can determine which preventative maintenance schedule will be less expensive than the other. Additionally or alternatively, the cost tool can be used to determine which preventative maintenance procedure will result in less down time compared to the other. Therefore, the data assimilator can assimilate preventative maintenance schedules of similarly situated components to curtail downtime of the corresponding utility assets and curtail costs of preventative maintenance while preventing failure of the corresponding components.

A sixth component 460 can be replaced and calibrated at the first interval of time. However, the sixth component 460 fails soon after, requiring replacement and calibration. Again, the sixth component fails soon after replacement and calibration. The data assimilator can receive assimilation data from the data assimilations sources that includes tags and manufacturer and part data, similar to a data cluster analyzer. Accordingly, the data assimilator can compare the preventative maintenance history of the sixth component 460 to similarly situated components. For example, the second component 420 can be a similarly situated component based on type (e.g., valve) with a similar tag. While the second component 420 and sixth component 460 can of the same type, the second component does not experience failure as consistently as the sixth component 460. However, the second component 420 can be of a different manufacturer than the sixth component 460. Therefore, the data assimilator can update the preventative maintenance schedule of the sixth component 460 to be replaced with a component of the same manufacturer of the second component 420. Moreover, the data assimilator can update preventative maintenance schedules of other components similarly situated to the second component 420. Alternatively, the sixth component 460 can be maintained at the same rate without failure and of the same manufacturer as the second component 420. Therefore, the preventative maintenance schedule can be assimilated with the second component 420 to prevent over maintenance.

Additionally, the data assimilator can receive a plurality of PMCRs. Accordingly, the data assimilator can prioritize the plurality of PMCRs based on assimilation data. For example, the data assimilator can prioritize the PMCRs to reduce downtime of utility assets. That is, components identified that have failed and need to be replaced, such as the sixth component 460, can result in downtime. Accordingly, downtime of utility assets can be reduced by prioritizing replacement of a failed component over reducing frequency of preventative maintenance procedures. However, a preventative maintenance schedule that reduces the frequency of preventative maintenance can be prioritized if the component is predicted to fail before preventative maintenance and will result in increased downtime of the corresponding utility asset.

Referring back to FIG. 2, the data assimilator can define boundaries for operation of a component, and/or similarly situated components in the PMCR at 228. That is, the data assimilator can be provided assimilation data that indicates regulations or requirements for motors. Accordingly, the data assimilator can update preventative maintenance schedules for components of the PMCR to increase the amount of time that components are calibrated to prevent failure. At 232, the data assimilator can provide the PMCR to a review. The review can be a subject matter expert (SME) or an electronic review.

Referring back to 208 of FIG. 2 the user is provided a GUI. Alternative to a manual process at 212, the user can select an automated process at 236. Alternatively, the remote utility controller can provide the sensor data and trend of the given component to a data cluster analyzer (e.g., the data cluster analyzer 132 of FIG. 1) in response to a warning or failure alert.

At 240, the data cluster analyzer can receive the sensor data and a trend of the given component. In an example, the data cluster analyzer can compare the trend (e.g., measured sensor data) to a historical trends of similarly situated components. Accordingly, the data cluster analyzer can identify a cause for the warning or failure alert corresponding to the given component based on symmetry between the trend of the given component and other similarly situated components. Moreover, the given component can be associated with another component based on a corresponding trend of sensor data provided to the data cluster analyzer, which can be further indicative of the cause of the failure/warning alert.

Figure 5:
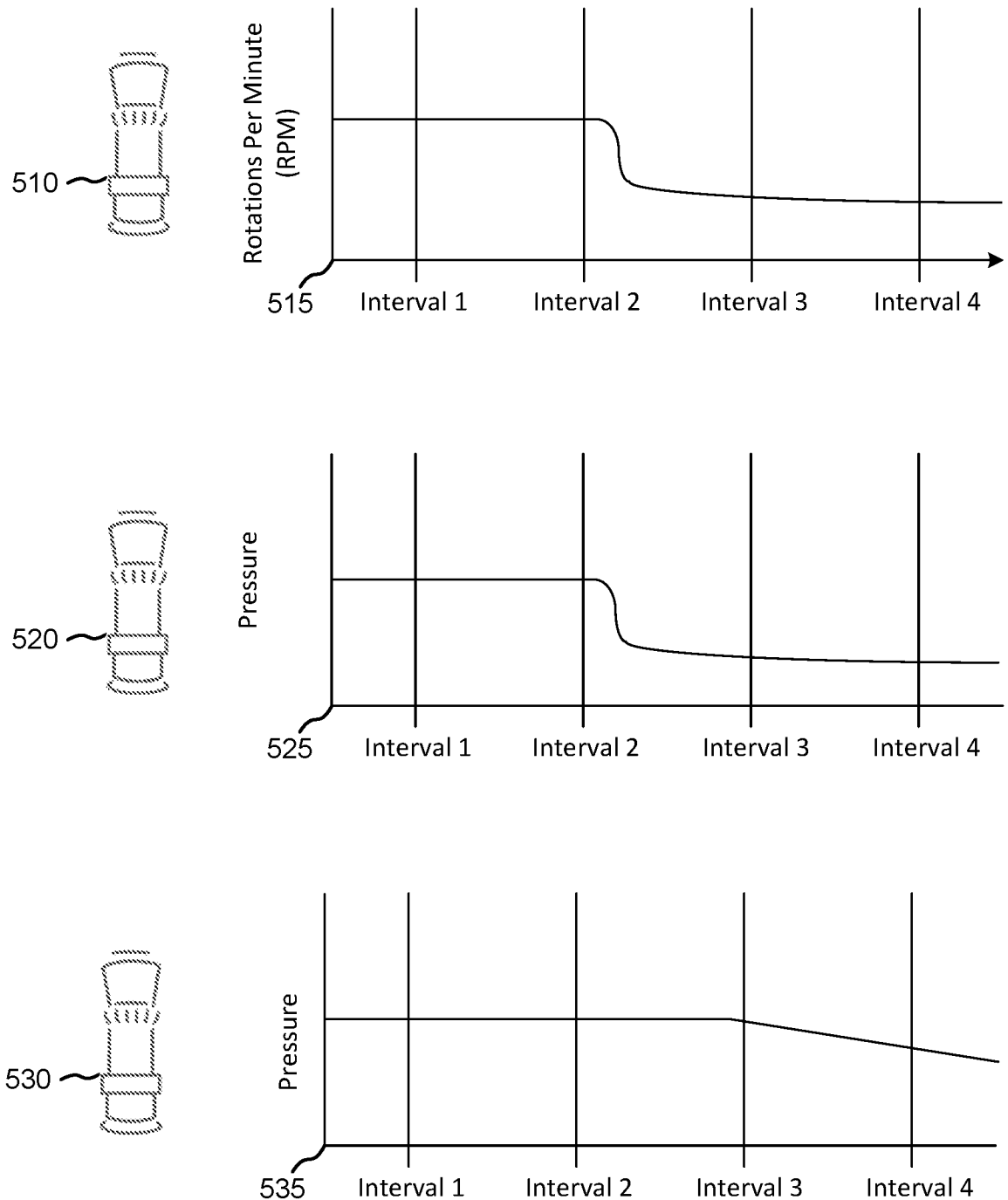
FIG. 5 illustrates example trends of components from a steam turbine.

FIG. 5 illustrates examples of trends of a motor component and corresponding pump of a utility asset. Particularly, a first component 510 can be a motor in a steam turbine, such as the steam turbine 109 of FIG. 1. A first graph 515 can illustrate a trend Rotations Per Minute (RPM) of the first component (e.g., motor) over time. Accordingly, a second component 520 can be a pump of the steam turbine. A second graph 525 can illustrate a trend in pressure for the second component (e.g., pump) of the steam turbine over time. The first component 510 has a trend of rotations per minute (RPM) over time that starts at an acceptable rate. However, the RPM of the first component 510 can be expected to stay constant or receive a constant input to control the RPM. Near the second interval of time, the first component 510 experiences a drop in RPMs that remains at a low level. The second component 520 has a trend of pressure that also starts at an acceptable rate and experiences a drop in pressure near interval two or near the same time as the first component.

A data cluster analyzer, such as the data cluster analyzer 132 of FIG. 1, can receive the trends of the first component 510 and the second component 520. Individually, the trend of the first component 510 can indicate a failure of the first component 510, such as a worn insulator, such that a failure alert can be provided for the first component to, or by a remote utility controller, such as the remote utility controller 104 of FIG. 1. Individually, the trend of the second component 520 can indicate a problem with the second component 520, such that a warning or failure alert is provided by the remote utility controller to indicate failure of a sensor associated with the second component 520. Accordingly, the data cluster analyzer can receive either the trend in operation of the first component 510 or the trend in operation of the second component 520 to verify a corresponding alert. That is, the data cluster analyzer can predict that the first component failed because of a worn insulator based on the trend of RPMs corresponding to the first component 510. Additionally, the data cluster analyzer can predict that the second component 520 failed based on the trend of pressure of the second component 520.

Because the data cluster analyzer receives the trends of both the first component 510 and the second components 520, the data cluster analyzer can determine a more accurate cause for the alerts of the components. That is, an insulator of the motor (e.g., first component 510) becoming worn can be the cause of drop in pressure produced by the valve (e.g., second component 520). Accordingly, the data cluster analyzer can determine that failure of the first component 510, or the decrease in pressure of the motor, is associated with both the trends of the first component 510 and second component 520. Thus, the data cluster analyzer can accurately identify and predict failure of each component associated with the received failure/warning alert.

Moreover, a third component 530 can be another pump of the steam turbine or the second component 520. A third graph 535 illustrates a trend in pressure over time for the third component 530. The pressure of the third component 530 is illustrated as having constant pressure until about the third interval of time and slowly decrease towards the fourth interval. The data cluster analyzer can receive the trend of pressure illustrated by the third graph 535 corresponding to the third component 530 to determine that the valve has failed or will fail. Moreover, the data cluster analyzer can receive a trend characterizing RPM of a motor corresponding to the third component 530. If the RPM of the motor is constant, the data cluster analyzer can determine that the third component 530 is experiencing a leak that is the cause of the slow loss in pressure. However, if the RPMs of the corresponding motor illustrate a similar loss in RPMs or are similar to the trend in RPMs illustrated by graph 515, the data cluster analyzer can determine that the cause in loss of pressure is associated with the motor. Moreover, the pressure illustrated by the third graph 535 of the third component 530 can be used to validate that the first component 510 and second component 520 are working correctly.

Referring back to FIG. 2, the data cluster analyzer can receive clustering data from clustering analysis sources at 244, which can be the clustering sources 130 of FIG. 1.

Accordingly, the data cluster analyzer can identify components that are similarly situated to the given component based on the clustering data.

FIG. 6 illustrates examples of clustering data 600 for groups of utility assets of a fleet of utility assets, such as the fleet of utility assets 108 of FIG. 1. Each group of utility assets can include a nuclear power generator that includes a nuclear pile, nuclear reactor, at least one steam turbine, and at least two valves.

As illustrated in FIG. 6, the components of each group of utility assets has clustering data, such as the clustering analysis sources 244 of FIG. 2, that is received from clustering sources, such as the clustering sources 130 of FIG. 1. As shown, a cluster data analyzer, such as the data cluster analyzer 132 of FIG. 1 can perform clustering analysis on the clustering data, such as the clustering analysis at 240 of FIG. 2. A component and trend data of a group of a first group of utility assets 610 can be provided to the data cluster analyzer. In response, the data cluster analyzer can receive a first set of clustering data 612 corresponding to the first group of utility assets 610. Accordingly, to identify similarly situated components to a motor 1 of a first group of utility assets 610, the data cluster analyzer can match Valve 1's tag "V–1" to the tag of Valve 1 of other groups of utility assets. That is, the tags for each component of the plurality of utility assets can uniquely identify an installation location and a type of the corresponding component. Stated differently, the tags can be metadata that is employed by the data cluster analyzer to determine the type and location of the corresponding component. For example, a second group of utility assets 620 can have a second set of clustering data 622. However, a second group of utility assets 620 does not identify individual components by number, or uses a tag that is unavailable or inaccessible. That is, the tag of both Valve 1 and Valve 2 of the second group of utility assets 620 is "V." Therefore, the data cluster analyzer can employ the type of Valve 1 to identify similarly situated valves because Valve 1 is of the "Throttle" type and Valve 2 is of the "Control" type. Accordingly, Valve 1 is of a "Throttle" type for both the first group of utility assets 610 and the second group of utility assets 620. Thus, the data cluster analyzer can match components based on type as stored in the respective first set of clustering data 612 and second set of clustering data 622.

A third group of utility assets 630 can have components similarly situated to the first group of utility assets 610 and the second group of utility assets 620. The third group of utility assets 630 can have a third set of clustering data 632 that includes tags that identify individual components, such that Valve 1 has a tag of "V–1." Therefore, Valve 1 of the third group of utility assets 630 can be matched to Valve 1 of the first group of utility assets 610 based on tags. Again, Valve 1 of the second group of utility assets 620 does not have tags that identify individual components. Moreover, the third group of utility assets 630 does not identify types of components. Because Valve 1 of the third group of utility assets 630 can be matched with Valve 1 of the first group of utility assets based on the tag, the data cluster analyzer can further ascertain that Valve 1 of the third group of utility assets 630 is similarly situated to Valve 1 of the second group of utility assets 620.

Referring back to FIG. 2 at 240, the data cluster analyzer can further compare sensor data and trends of similarly situated components received by the remote utility controller to identify a preventative maintenance opportunity. Particularly, the data cluster analyzer can compare preventative maintenance history of similarly situated components to predict and prevent failure of a given component identified in a warning alert.

Referring back to FIGS. 4A-4B, a first component 410 can have a preventative maintenance schedule that includes preventative maintenance (e.g., calibration at a each of a first, second, third, and fourth interval. The second component 420 can be similarly situated to the first component 410, but have a different preventative maintenance schedule. That is, the second component 420 can receive preventative maintenance at the first and third intervals. Therefore, the first component 410 and second component 420 can have different preventative maintenance schedules. Accordingly, the data cluster analyzer, such as the data cluster analyzer 132 of FIG. 1, can identify a preventative maintenance opportunity based on the difference in preventative maintenance schedules of the first component 410 and second component 420.

Referring back to FIG. 2, the data cluster analyzer can generate a preventative maintenance opportunity at 248. The preventative maintenance opportunity can identify the component of the warning/failure alert, as well as related components identified by the data cluster analyzer based on sensor data and trends. Additionally, the preventative maintenance opportunity can identify similarly situated components and the preventative maintenance schedule of the similarly situated components. Accordingly, the data cluster analyzer can make a recommendation for preventing failure of the component of the warning/failure alert, as well as the similarly situated components, based on the trends and preventative maintenance history of similarly situated components. Moreover, the data cluster analyzer can provide reasoning for the recommendation, which is based on the trends and preventative maintenance of similarly situated components. Further, the recommendation and reason for change can be provided by the data cluster analyzer in a uniform format, such as a code. Further still, the data cluster analyzer can generate an identifier for the similarly situated components that is of a uniform format and stored in a data repository, such as data repository 128 of FIG. 1.

At 226, a determination is made an SME, or automatically by machine learning, of whether the preventative maintenance opportunity generated by the data cluster analyzer is acceptable. In some examples, the preventative maintenance opportunity can identify one or a few similarly situated components to the component identified by the warning/failure alert. Moreover, one or a few of similarly situated components can have the same preventative maintenance schedules. That is, the preventative maintenance opportunity may not have had enough information to make an accurate recommendation. Accordingly, the preventative maintenance opportunity can be considered unacceptable for evaluation. If the determination at 226 is negative (e.g., NO), the method 200 proceeds to 230. At 230, the preventative maintenance opportunity can be updated to include an accurate recommendation with appropriate reasoning. If the determination at 226 is positive (e.g., YES), the preventative maintenance opportunity is considered acceptable and proceeds to 220, similar the preventative maintenance opportunity generated at 216.

The asset information center that employs the method 200 can reduce the downtime of utility assets by identifying similarly situated components and assimilating preventative maintenance schedules of the similarly situated components. Moreover, the method 200 includes a manual process at 212 and an automatic process at 236 that provide flexibility to the asset information center to identify components for preventative maintenance opportunities. The manual process and automatic process can occur contemporaneously, as the asset information center can be employed to manage preventative maintenance of components associated with over 450,000 components. Moreover, the data cluster analyzer and data assimilator can employ machine learning on data that is received from sources 224 and 244 that can include various formats associated with the over 450,000 components. Accordingly, the method 200 implemented by the asset information center can efficiently generate PMCRs to reduce downtime of utility assets.

Figure 7:
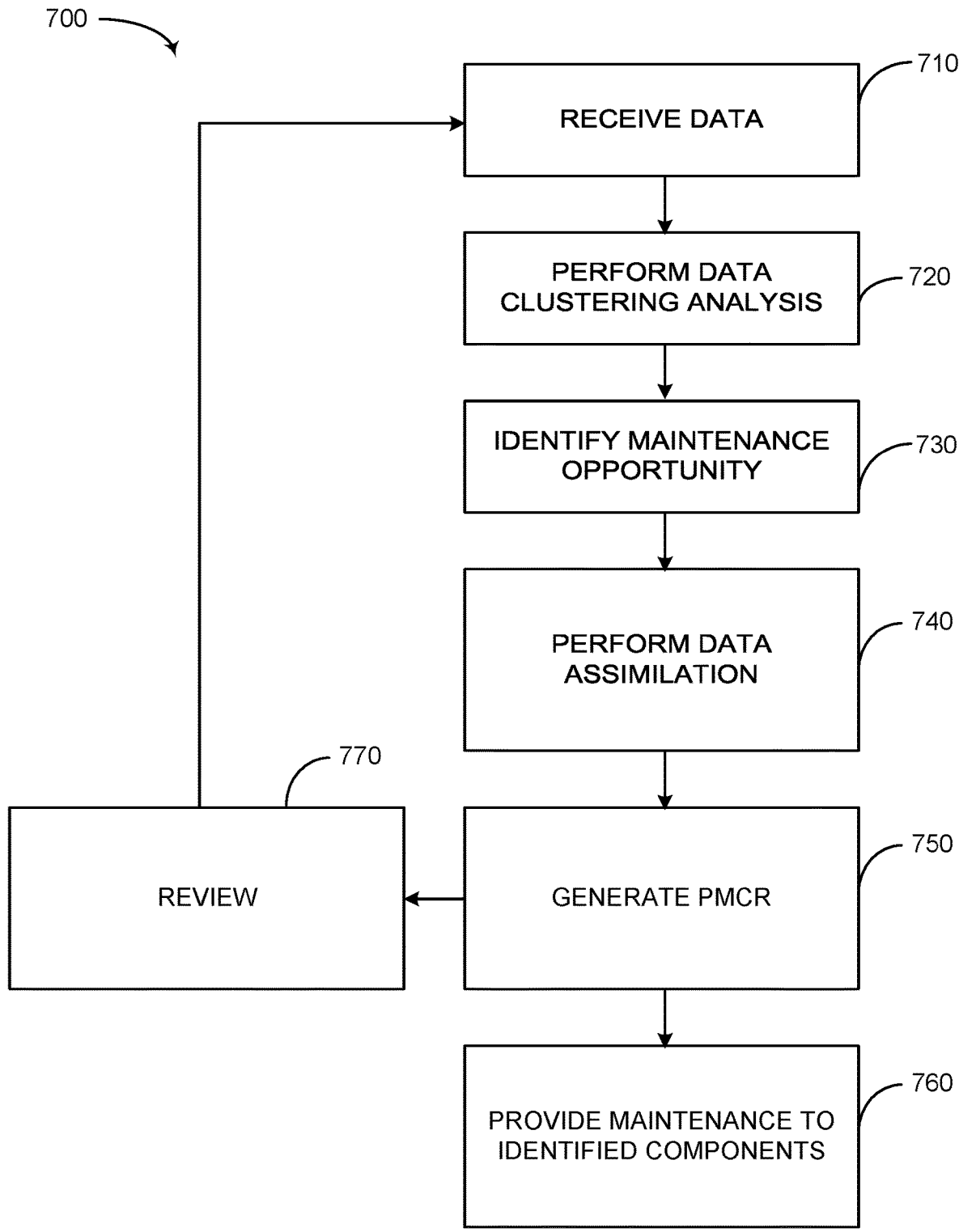
FIG. 7 illustrates a flowchart of an example method for employing the asset information center to identify maintenance opportunities in a group of steam turbines.

In view of the foregoing structural and functional features described above, an example method will be better appreciated with reference to FIG. 7. While, for purposes of simplicity of explanation, the example method of FIG. 7 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 7 illustrates another flowchart of an example method 700 for generating a PMCR by an asset information center, such as the asset information center 100 of FIG. 1. At 710, the data cluster analyzer can receive an alert for a component of a group of utility assets, such as the group of utility assets 108 of FIG. 1. At 720, a data cluster analyzer, such as the data cluster analyzer 132 of FIG. 1, can perform clustering analysis on the component identified in the alert. Particularly, the data cluster analyzer can identify similarly situated components to the component identified in the alert based on clustering data.

At 730, the data cluster analyzer can generate a preventative maintenance opportunity based on the preventative maintenance schedules of the similarly situated components. At 740, a data assimilator, such as the data assimilator 136 of FIG. 1, can assimilate the preventative maintenance schedules of the similarly situated components identified by the preventative maintenance opportunity. At 750, the data assimilator can generate a PMCR to change the preventative maintenance schedules of the similarly situated components. Accordingly, the PMCR can be provided to a to a remote service device positioned with a service crew at 760, such as the remote service device 140 in FIG. 1. Therefore, the PMCR can be provided to the remote service device to execute the PMCR. Alternatively, the PMCR can be provided to an SME for review at 770. Moreover, the PMCR can be provided as feedback to the data cluster analyzer and the data assimilator.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means based at least in part on". Additionally, where the disclosure or claims recite "a," "an," "a first," or "another" element, or the equivalent thereof, it should be interpreted to include one or more than one such element, neither requiring nor excluding two or more such elements.

What is claimed:

1. A non-transitory computer readable medium, the non-transitory computer readable medium having machine executable instructions, the machine executable instructions comprising:
   a data cluster analyzer that:
   receives an alert from a remote utility controller that identifies a component of a utility asset of a plurality of utility assets;
   identifies, by applying a first machine learning, a group of components similarly situated to the component by matching clustering data of the component with clustering data of the group of components;
   identifies asymmetry among preventative maintenance schedules for the group of components, wherein identifying the asymmetry includes identifying a difference in frequency among the preventive maintenance schedules for the group of components; and
   generates a preventative maintenance opportunity that identifies the component and a recommendation for the component; and
   a data assimilator that:
   assimilates the preventative maintenance schedule for the group of components based on assimilation data including failure history of each component of the group of components; and
   generates, by applying a second machine learning, a preventative maintenance change request (PMCR) including a different recommendation for the component than was provided by the preventive maintenance opportunity, based on the assimilation data; and
   provides the PMCR as feedback to the data cluster analyzer and the data assimilator to update the first machine learning of the data analyzer and the second machine learning of the data assimilator to improve the accuracy of the first machine learning and the second machine learning, and wherein the data assimilator provides the PCMR to a remote service device to output the PMCR for a service crew.

2. The medium of claim 1, wherein the preventative maintenance opportunity is automatically generated by the data cluster analyzer in response to the alert from the remote utility controller.

3. The medium of claim 1, wherein the preventative maintenance opportunity is a first preventative maintenance opportunity, and the machine executable instructions further comprise:
   a graphical user interface (GUI) that receives a second preventative maintenance opportunity from a user and provides the second preventative maintenance opportunity to the data assimilator to generate a second PMCR.

4. The medium of claim 3, wherein the data cluster analyzer receives the clustering data from a plurality of clustering sources stored in a data repository, the clustering data comprising:
   preventative maintenance schedules for each component of the plurality of utility assets;
   tags for each component of the plurality of utility assets that uniquely identify an installation location and a type of a corresponding component; and
   manufacturer and part data for each component of the plurality of utility assets that characterizes a manufacturer and specifications of the corresponding component.

5. The medium of claim 4, wherein the data assimilator receives the assimilation data from a plurality of data assimilations sources stored in the data repository, the assimilation data comprising:
  work order history for each component of the plurality of utility assets that characterizes maintenance procedures performed in response to failures associated of the corresponding component;
  cost data, from a cost analysis tool, that defines a cost for maintenance and preventative maintenance procedures for each component, and compares the cost with downtime of the corresponding utility asset to determine the preventative maintenance schedule to assimilate for the group of components; and
  a functional importance determination (FID) for each component of the plurality of utility assets that characterizes boundaries for the preventative maintenance schedule of the corresponding component.

6. The medium of claim 5, wherein clustering data and assimilation data are received from a plurality of respective clustering sources and data assimilations sources by the remote utility controller that provides the clustering data and assimilation data the data repository.

7. The medium of claim 6, wherein the component identified by the first preventative maintenance opportunity is a first component and the group of components is a first group of components, and the second preventative maintenance opportunity identifies a second component of a second group of components, such that the first PMCR assimilates a first preventative maintenance schedule for the first group of components and the second PMCR assimilates a second preventative maintenance schedule for the second group of components.

8. The medium of claim 7, wherein the first PMCR reduces a frequency of preventative maintenance in the first preventative maintenance schedule to curtail a cost determined for the first preventative maintenance schedule, and the second PMCR increases the frequency of preventative maintenance in the second preventative maintenance schedule of the second group of components to curtail downtime of the corresponding utility asset.

9. The medium of claim 8, wherein the data assimilator prioritizes the first PMCR over the second PMCR to curtail cost in response to predicting that a given preventative maintenance procedure of the second preventative schedule will occur prior to failure of the second component based on work order history of the second group of components.

10. The medium of claim 8, wherein the data assimilator prioritizes the second PMCR over the first PMCR to curtail downtime in response to predicting that the second component will fail prior to a given preventative maintenance procedure of the second preventative schedule based on work order history of the second group of components.

11. The medium of claim 9, wherein the data assimilator adjusts the first preventative maintenance schedule to increase the frequency of preventative maintenance procedures above a boundary characterized by the FID.

12. The medium of claim 1, wherein the component is a set of components identified by the alert that includes sensor data for the set of components over time.

13. The medium of claim 12, wherein the data cluster analyzer determines a cause for the alert based on the sensor data for the set of components to identify the group of components similarly situated to a subset of components associated with the determined cause.

14. A method for generating a preventative maintenance change request (PMCR), the method comprising:
  receiving, by a data cluster analyzer operating on a computing platform, an alert from a remote utility controller that identifies a component of a utility asset of a plurality of utility assets;
  identifying, by the data cluster analyzer, based on applying a first machine learning, a group of components similarly situated to the component by matching clustering data of the component with clustering data of the group of components;
  identifying, by the data cluster analyzer, asymmetry among preventative maintenance schedules for the group of components, wherein identifying the asymmetry includes identifying a difference in frequency among the preventive maintenance schedules for the group of components;
  generating, by the data cluster analyzer, a preventative maintenance opportunity that identifies the component and a recommendation for the component;
  assimilating, by a data assimilator, the preventative maintenance schedule for the group of components based on assimilation data including failure history of each component of the group of components;
  generating, by the data assimilator, based on applying a second machine learning, a preventative maintenance change request (PMCR) including a different recommendation for the component than was provided by the preventive maintenance opportunity, based on the assimilation data; and
  providing, by the data assimilator, the PMCR as feedback to the data cluster analyzer and the data assimilator to update the first machine learning of the data analyzer and the second machine learning of the data assimilator to improve the accuracy of the first machine learning and the second machine learning, and providing by the data assimilator the PCMR to a remote service device to output the PMCR for a service crew.

15. The method of claim 14, further comprising:
  receiving, by the remote utility controller, the clustering data from a plurality of clustering sources;
  receiving, by the remote utility controller, the assimilation data from a plurality of data assimilations sources; and
  storing, by the remote utility controller, the cluster data and assimilation data in a data repository operating on the computing platform, such that the data cluster analyzer receives clustering data from the data repository and the data assimilator receives assimilation data from the data repository.

16. The method of claim 15, further comprising:
  receiving, by the remote utility controller, sensor data and a trend for a set of components of the utility asset, wherein the component identified by the alert is a first component of the set of components of the utility asset;
  identifying, by the data cluster analyzer, a second component related to the first component of the set of components based on the sensor data and trend; and
  determining, by the data cluster analyzer, a cause for the alert by comparing the sensor data and trend of the set of components to sensor data and a trend of components similarly situated to the first and second component.

17. A non-transitory computer readable medium, the non-transitory computer readable medium having machine executable instructions, the machine executable instructions comprising:
  a remote utility controller that receives sensor data and a trend of the sensor data for a plurality of components of a utility asset of a plurality of utility assets, wherein the remote utility controller generates an alert for the utility asset in response to the trend; and a data cluster analyzer that, receives the alert from the remote utility controller and identifies a component of the plurality of components;

identifies, by applying a first machine learning, a group of components similarly situated to the component by matching clustering data of the component with clustering data of the group of components, wherein the clustering data is received by the data cluster analyzer from a data repository operating on a computing platform;

identifies asymmetry among preventative maintenance schedules for the group of components, wherein identifying the asymmetry includes identifying a difference in frequency among the preventive maintenance schedules for the group of components; and generates a preventative maintenance opportunity that identifies the component and a recommendation for the component; and a data assimilator that, assimilates the preventative maintenance schedule for the group of components based on assimilation data including failure history of each component of the group of components, wherein the assimilation data is received by the data assimilator from the data repository;

generates, by applying a second machine learning, a preventative maintenance change request (PMCR) including a different recommendation for the component than was provided by the preventive maintenance opportunity, based on the assimilation data; and provides the PMCR as feedback to the data cluster analyzer and the data assimilator to update the first machine learning of the data analyzer and the second machine learning of the data assimilator to improve the accuracy of the first machine learning and the second machine learning, and wherein the data assimilator provides the PCMR to a remote service device to output the PMCR for a service crew.

18. The non-transitory computer readable medium of claim 17, wherein the preventative maintenance opportunity is a first preventative maintenance opportunity, and the remote utility controller provides a graphical user interface (GUI) that receives a second preventative maintenance opportunity from a user and provides the second preventative maintenance opportunity to the data assimilator to generate a second PMCR.

19. The non-transitory computer readable medium of claim 18, wherein the first preventative maintenance opportunity is automatically generated by the data cluster analyzer in response to the alert from the remote utility controller.

20. The non-transitory computer readable medium of claim 17, wherein the data cluster analyzer determines a cause for the alert based on the sensor data for the plurality of components to identify the group of components similarly situated to the plurality of components of components associated with the determined cause.

* * * * *